(12) United States Patent
Clausmann et al.

(10) Patent No.: US 9,008,847 B2
(45) Date of Patent: Apr. 14, 2015

(54) METHOD OF CONTROLLING A COOLING DEVICE FOR A MACHINE TOOL

(75) Inventors: Denis Clausmann, Dorlisheim (FR); Laurent Augelmann, Bergheim (FR); Claude Kehren, Dettwiller (FR); Christophe Joubert, Rosheim (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 489 days.

(21) Appl. No.: 13/426,278

(22) Filed: Mar. 21, 2012

(65) Prior Publication Data

US 2012/0245742 A1    Sep. 27, 2012

(30) Foreign Application Priority Data

Mar. 23, 2011 (FR) ...................... 11 52424

(51) Int. Cl.
*G05D 7/00* (2006.01)
*B23Q 11/10* (2006.01)
*B23Q 17/00* (2006.01)

(52) U.S. Cl.
CPC ............ *B23Q 11/1084* (2013.01); *B23Q 11/10* (2013.01); *B23Q 11/1038* (2013.01); *B23Q 17/00* (2013.01)

(58) Field of Classification Search
CPC .............. B23Q 11/1084; B23Q 11/10; B23Q 11/1038; B23Q 17/00
USPC .............................. 700/281–283; 137/1, 8, 12
See application file for complete search history.

(56) References Cited

U.S. PATENT DOCUMENTS

| | | | | |
|---|---|---|---|---|
| 5,999,106 A | * | 12/1999 | Buckler | 340/870.09 |
| 6,874,977 B2 | * | 4/2005 | Cook et al. | 408/1 R |
| 7,481,696 B2 | * | 1/2009 | Mukai et al. | 451/7 |
| 2004/0118457 A1 | | 6/2004 | Sugata et al. | |
| 2010/0189572 A1 | * | 7/2010 | Hansen | 417/44.1 |

FOREIGN PATENT DOCUMENTS

JP          62-130149 A          6/1987

OTHER PUBLICATIONS

French Search Report of FR 11 52424, dated Oct. 25, 2011.

* cited by examiner

*Primary Examiner* — Mohammad Ali
*Assistant Examiner* — Nathan Laughlin
(74) *Attorney, Agent, or Firm* — Sughrue Mion, PLLC

(57) ABSTRACT

A method of controlling a cooling device for cooling a cutting tool in a machine tool. The method comprising the steps of:
controlling the motor to drive the pump in such a manner that the pump feeds the nozzle with machining fluid at a constant flow rate D1 that is equal to a first flow rate setpoint;
measuring a parameter P representative of a fluid outlet pressure from the nozzle; and
comparing an estimated outlet pressure Pestim as estimated from the parameter P with a first predetermined pressure threshold Ps1, and controlling the motor so as to increase the fluid flow rate D1 as delivered by the pump if the estimated output pressure drops below the first pressure threshold Ps1.

9 Claims, 2 Drawing Sheets

METHOD OF CONTROLLING A COOLING DEVICE FOR A MACHINE TOOL

BACKGROUND OF THE INVENTION

The invention relates to the field of cooling a cutting tool in a machine tool that has such a cutting tool.

In machine tools, it is common practice to use cooling devices to spray and lubricate cutting tools, thereby limiting tool wear and reducing the risk of breakage and of the machine tool being stopped.

By delivering a stream of machining fluid into the region where the tool comes into contact with the part being machined, it is possible to reduce friction and to cause the heat that is produced to be dissipated in the stream of cooling fluid.

In spite of such a cooling device being used, machine tools continue to be stopped as a result of wear, of a tool breaking, or of becoming clogged with swarf.

OBJECT OF THE INVENTION

An object of the invention is to provide a solution that enables machine tool stoppage time to be reduced, that improves cutting conditions, and that also improves tool lifetimes.

SUMMARY OF THE INVENTION

In order to achieve this object, there is provided a method of controlling a cooling device for cooling a cutting tool for a machine tool fitted with such a cutting tool. The cooling device comprises:
  a supply of machining fluid;
  a pump connected to the supply;
  a drive motor for driving the pump;
  a cooling nozzle for cooling the tool; and
  at least one machining fluid transfer duct connecting the pump to an input of the nozzle.

The method further comprises the steps of:
  controlling the motor to drive the pump in such a manner that the pump feeds the nozzle with machining fluid at a constant flow rate D1 that is equal to a first flow rate setpoint D;
  measuring a parameter P representative of a fluid outlet pressure from the nozzle; and
  comparing an estimated outlet pressure as estimated from the parameter P with a first predetermined pressure threshold Ps1, and controlling the motor so as to increase the fluid flow rate D1 as delivered by the pump if the estimated output pressure drops below the first pressure threshold Ps1.

In order to understand the invention, it should be considered that the fluid flow rate is constant providing it remains within ±5% of the predetermined flow rate value.

Thus, if by using said measured parameter P representative of the present fluid pressure D1, it is found that the present fluid pressure D1 drops below a first predetermined pressure threshold Ps1, then the pump motor is controlled so as to increase the flow rate. The purpose of this flow rate increase is to compensate the pressure drop that would otherwise give rise to a drop in the impact force of the cooling fluid against the machining swarf.

The nozzle feed pressure parameter is important since it determines the impact force at the outlet from the nozzle and consequently encourages separation of swarf from the part being machined. By controlling the impact force, wear is reduced and tool heating is reduced, as is tool clogging associated with pieces of swarf that are too long.

The control method of the invention thus serves to maintain a certain capacity for removing and breaking up the swarf that is produced during machining.

By means of the method of the invention, it is found that the statistical mean length of pieces of swarf is generally reduced in comparison with situations in which the method of the invention is not used for cooling the cutting tool.

It is found that by separating pieces of swarf by the impact of the cooling fluid and by shortening the statistical mean length of the pieces of swarf:
  swarf has less tendency to wrap around the tool and the tool carrier, thereby reducing the number and the duration of machine tool stoppages associated with it becoming clogged with swarf; and
  swarf has less tendency to press against the cutting face of the tool, since it is moved away therefrom under the effect of the impact of the cooling fluid, and as a result both tool wear and tool heating during machining are reduced.

It should be observed that it is advantageous to control the motor so that the pump feeds the nozzle at a constant rate since that avoids transient phenomena associated with variations in the nozzle feed rate, thereby enabling better control to be obtained over the impact force.

BRIEF DESCRIPTION OF THE DRAWINGS

Other characteristics and advantages of the invention appear clearly from the following description given by way of non-limiting indication and with reference to the accompanying drawings, in which.

DETAILED DESCRIPTION OF THE INVENTION

Figure 1:
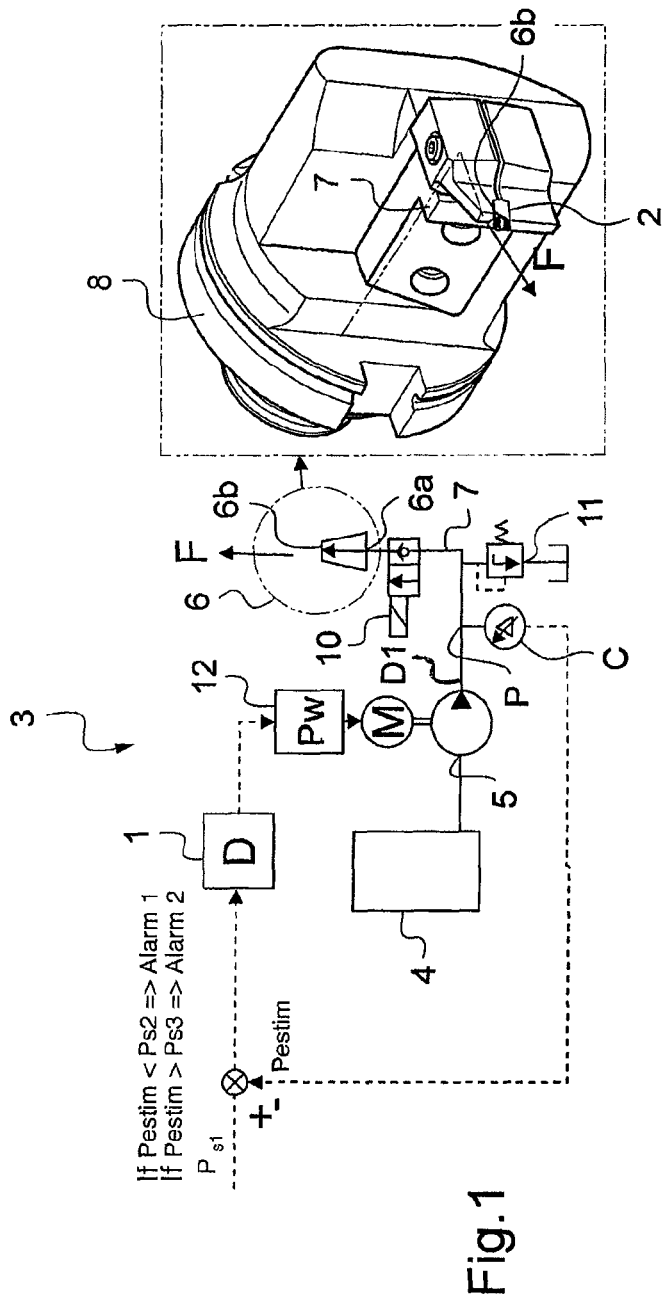
FIG. 1 shows the tool-cooling device of the invention with its regulation loop enabling it to be controlled by the method of the invention.

FIG. 1 shows a machine tool 3 having a cutting tool 2 and a cooling device 1 for implementing the method of the invention.

The cooling device 1 has a cooling nozzle 6 shown in detail in the box in FIG. 1.

The nozzle is assembled on a tool carrier 8 of the machine tool 3 and it includes actuators for moving the tool and the tool carrier in compliance with programmed commands. The tool 2, specifically a machining tip for performing a turning operation, is fastened on the tool carrier 8. The outlet 6b from the nozzle is directed towards a portion of the cutting tool 2 so as to cool its cutting face directly.

The nozzle 6 is fed by a fluid transfer duct 7 that extends at least in part inside the tool carrier 8, with this portion being represented by a chain-dotted line.

The tool carrier 8 comprises a perforated metal block, the perforation forming a portion of the fluid transfer duct 7, and the nozzle 6 is assembled with the metal block so that its nozzle inlet 6a communicates with the outlet from the fluid transfer duct 7 inside the metal block.

This assembly technique is strong since the nozzle is assembled directly in the tool carrier, while reducing the distance between the nozzle outlet 6b and the tool 2, but without it being necessary to lengthen the fluid transfer duct 7 in order to go round the tool carrier. The feed pressure P of the nozzle 6 may be high (generally of the order of 170 bar to 240 bar, with this pressure being associated with the material being machined and with the cutting conditions implemented) and the head loss remains small since the length of the fluid transfer duct 7 is likewise small.

The nozzle 6 possesses a fluid flow section that is rigid and constant, ignoring wear. This flow section S is circular, with a diameter D, giving a section of area $S=\pi D^2/4$.

The cooling device 1 also includes a hydraulic pump 5 of constant cylinder capacity having a fluid inlet connected to a supply of machining fluid 4 and an outlet connected to an inlet 6a of the nozzle via a fluid transfer duct 7. The pump 5 is driven in rotation by an electric motor M. The power supply to the motor M is provided by a frequency converter (variable speed drive) 12 adapted to control the motor so that the flow rate D1 delivered by the pump tends towards the flow rate setpoint D.

This frequency converter (variable speed drive) 12 is fitted with means for measuring the electric power Pw consumed by the motor and its speed of rotation. The motor M may be fitted with a tachometer in order to measure the number of pump cycles performed per unit time. It is also possible to use one of the internal variables measured by the frequency converter and to treat it as a measurement of the speed of rotation of the motor. The present fluid flow rate D1 being delivered by the pump of the nozzle 6 is given by D1=pump cylinder capacity× number of pump cycles (frequency of rotation).

The cooling device also includes a pressure sensor C adapted to generate a signal representative of a pressure P of machining fluid between the pump 5 and the nozzle 6. The pressure sensor C is placed on said transfer duct as close as possible to the inlet 6a of the nozzle 6. Thus, arrangements are preferably made to ensure that the length of the duct between the pressure sensor C and the inlet 6a of the nozzle is less than $1/10^{th}$ of the length of the duct between the pump 5 and the sensor C. By measuring the pressure P upstream from the nozzle 6, and as close as possible thereto, and knowing the head losses induced by the calibrated nozzle 6, it is possible to estimate quite accurately the pressure of the fluid Pestim at the outlet from the nozzle. The accuracy of this estimate increases with P being measured closer to the nozzle (since that reduces the influence on the estimate of interfering phenomena associated with the distance between the measurement and the outlet of the nozzle).

The cooling device also includes a two-position control valve 10. In one position, it prevents fluid from passing from the pump 5 to the nozzle 6, thereby preventing the circuit from emptying when the pump is stopped. In the other position, the slide of the valve 10 puts the pump 5 directly into communication with the nozzle 6, this second position being the position that is used while the tool is being cooled. Finally, the cooling device includes a pressure limiter 11 that is adjusted to enable the fluid to return from the duct 7 to the sump in the event of the pressure in the circuit being too high. This pressure limiter 11 constitutes a safety device.

As mentioned above, the method of the invention for controlling the cutting tool cooling device 1 consists mainly in:

controlling the motor M in such a manner that the pump 5 feeds the nozzle 6 with machining fluid at a constant rate D1 that is equal to a first flow rate setpoint D;

measuring the parameter P representative of pressure at the fluid outlet of the nozzle 6 (specifically this parameter P is a present pressure P being measured in the duct 7 between the pump and the nozzle);

comparing an outlet pressure Pestim as estimated using the measured parameter P with a first predetermined pressure threshold Ps1; and controlling the motor M in such a manner as to increase the fluid flow rate D1 delivered by the pump 5 if the estimated outlet pressure drops below the first pressure threshold Ps1 (specifically in order to increase this flow rate D1, the flow rate setpoint D is increased and the motor 5 continues to be controlled to track the modified setpoint D).

In addition, as can be seen in the regulation loop of FIG. 1, the method includes a step of comparing the outlet pressure Pestim as estimated using the parameter P with a second predetermined pressure threshold Ps2. If the estimated outlet pressure Pestim drops below the second predetermined pressure threshold Ps2, then an alarm Alarm1 is generated to indicate a worn nozzle.

Given that the nozzle 6 possesses a constant fluid flow section, ignoring wear, the fact of monitoring the estimated fluid pressure Pestim at the outlet from the nozzle (by means of the pressure P, while the nozzle is being fed at a constant rate D1) makes it possible to detect wear in the nozzle 6.

If it is found that the outlet pressure Pestim from the nozzle drops too far, specifically below the second predetermined pressure threshold Ps2, that means that the minimum flow section S for fluid in the nozzle has increased as a result of the nozzle 6 becoming worn, or possibly as a result of leakage from the circuit (e.g. leakage via one of its components), thereby leading to a decrease in the fluid pressure at the outlet 6a of the nozzle and to a reduction in the impact force F of the fluid on the machining swarf.

By means of this worn nozzle alarm Alarm1, the operator estimates the wear of the nozzle 6 without it being necessary to stop the cooling device 1.

Once the worn nozzle indicator alarm Alarm1 has been generated, the operator may take action to verify the real state of the nozzle 6. A nozzle may optionally be replaced by a nozzle that is not worn and that is suitable for generating the desired impact force F with the normal fluid flow rate.

As can be seen in FIG. 1, the method includes another step of comparing the estimated outlet pressure Pestim with a third predetermined pressure threshold Ps3.

If the estimated outlet pressure Pestim drops below the third predetermined pressure threshold Ps3, then an alarm Alarm2 is generated indicating that the nozzle is obstructed. This alarm Alarm2 may optionally be accompanied by an action to stop the motor in order to avoid destroying the device.

By using the estimated pressure Pestim to monitor the fluid pressure at the outlet from the nozzle while it is being fed at a constant rate D1, it is possible to detect any reduction in the fluid flow section S through the nozzle 6, or more generally anywhere within the circuit. Thus, when the estimated nozzle outlet pressure increases above the third predetermined threshold Ps3, it is known that the nozzle is blocked at least in part, e.g. by swarf, and it is known that the impact force F at the outlet from the nozzle is certainly degraded.

The operator warned by the alarm Alarm2 can take action, e.g. clear the nozzle, so that the cooling fluid impact force F on the swarf returns to a desired nominal level.

Figure 3:
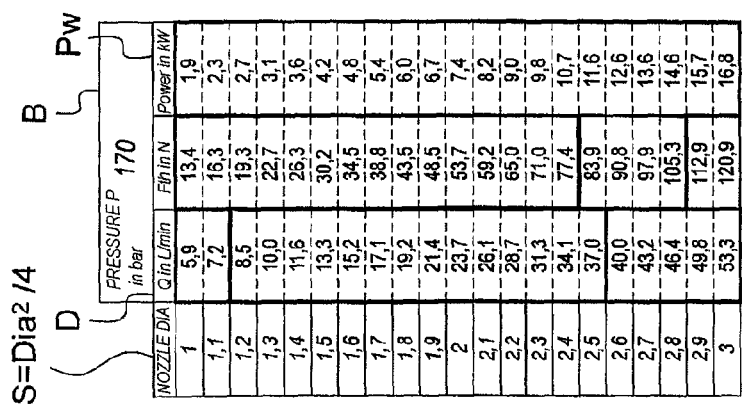
FIG. 3 is a table showing a portion of a database used for implementing the method of the invention.

Advantageously, the method includes a step of determining the first flow rate setpoint D using a database B as shown in FIG. 3.

This database B applies to a plurality of given nozzle flow sections S and gives pairs of cooling fluid pressure and flow rate values (P, Q) needed for generating a theoretical impact force level Fth at the outlet from the nozzle 6.

By using such a database B, it is possible to improve the speed with which the cooling device is controlled (the time required for calculation is shortened because the setpoint values have already been calculated in part and stored in the database B).

There are several techniques for generating the database B. A first technique, which is relatively approximate, is by theoretical calculation. A second technique, which is more accurate, is by testing the behavior of the cooling device and by measuring its behavior.

In the first technique, it is possible to generate the database B using the following formulae:

$$Q = 0.454 \times \text{Dia}^2 \times P^{1/2} \quad (1)$$

where:
Q in liters per minute (L/min) is the value of the flow rate;
0.454 is a coefficient that is determined as a function of the viscosity of the cooling fluid and of head losses in the cooling device;
Dia, in millimeters (mm) is the diameter of the fluid flow section in the nozzle; and
P, in bar, is the theoretical feed pressure needed for generating a flow rate Q using a given nozzle having a flow section $S = \pi \times \text{Dia}^2/4$.

$$Fth = 0.079 \times P \times \text{Dia}^2 \quad (2)$$

where:
0.079 is a constant specific to the cooling device and to the type of nozzle used; and
Fth, in newtons (N) is the theoretical impact force of the jet at the outlet from the nozzle having a cylindrical flow section of diameter Dia when fed with cooling fluid at a pressure P measured in bar.

$$Pw = P \times Q/(600 \times 0.9) \quad (3)$$

where:
Pw, in kilowatts (kW) is the theoretical power fed to the motor in order to deliver a cooling liquid flow to the nozzle inlet at a pressure P and a flow rate Q; and
0.9 is a coefficient that depends on the cooling device.

The second technique, which is more accurate, involves generating the database B by performing successive steps on the cutting tool cooling device 1. For each test, a nozzle of given diameter is installed and the nozzle is fed at various pressures P and flow rates Q.

For each nozzle of given diameter Dia, as soon as steady conditions have been reached, the values of the feed pressure P, of the feed flow rate Q, and of the power Pw consumed by the motor M are measured and a value for the theoretical impact force Fth at the outlet from the nozzle is estimated/calculated.

Thus, for each recorded flow rate value Q, the database B includes a corresponding nozzle flow section S (specifically a diameter Dia that defines S uniquely), a corresponding measured pressure value P, and a consumed power Pw.

The impact force F obtained at the outlet from the nozzle is thus expressed as a theoretical impact force Fth at the outlet from the nozzle that is a function of the fluid flow section S of the nozzle, of the flow rate D, and of the pressure P with which the nozzle is fed with cooling fluid.

By means of this database B, and as a function of the measured present flow rate D1 and of the measured present feed pressure P, it is possible to evaluate the present section S of the nozzle.

It is thus possible to estimate the variation over time of the section S and the state of wear of the nozzle.

Furthermore, knowing both this present flow section S and the desired theoretical impact force Fth (the desired impact force is given by the programmer as a function of the swarf section to be removed and as a function of the material being machined), it is possible to determine the pair of pressure and theoretical flow rate values (P, Q) that should be applied to the nozzle in order to obtain this desired theoretical impact force Fth.

Once the theoretical value for the flow rate Q has been identified in the database, the first flow rate setpoint D is set as a function of Q. For example, it is possible to use the relationship D=Q.

Likewise, as a function of the pressure value P in the pair (P, Q) obtained from the database B, the first, second, and third pressure thresholds Ps1, Ps2, and Ps3 are set in application of predefined rules.

Thereafter, the pump 5 is controlled via its motor M so that the flow rate D is as close as possible to the setpoint D, and the estimated present pressure Pestim as deduced by measuring the present pressure P between the pump and the nozzle is compared with each of these thresholds Ps1, Ps2, and Ps3.

If the estimated pressure Pestim<Ps1, then the value of the flow rate setpoint D is increased, thereby enabling a force F to be obtained that is close to the required nominal force Fth.

Figure 2:
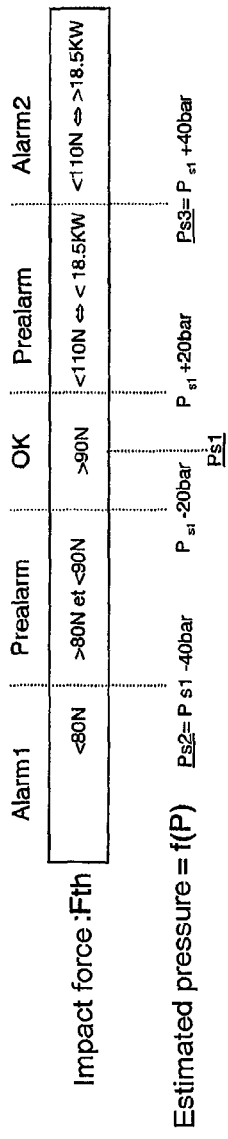
FIG. 2 is a table showing, as a function of differences observed between the measured present pressure P and the first predetermined pressure threshold Ps1, the various alarms that are generated and the jet impact forces that are generally observed at the nozzle outlet (the indicated forces and alarms are generated by implementing the method of the invention, as a function of a parameter that is representative of the pressure at the outlet from the nozzle, specifically P)

If Pestim<Ps2, then a worn nozzle alarm Alarm1 is generated. Specifically, in the example of FIG. 2, the following rule is applied:

$$Ps2 = Ps1 - 40 \text{ bar}$$

If Pestim>Ps3, then a clogged nozzle alarm Alarm2 is generated. Specifically, in the example of FIG. 2, the following rule is applied:

$$Ps3 = Ps1 + 40 \text{ bar}$$

Preferably, in order to determine the increase in fluid flow rate that needs to be applied to D when the estimated outlet pressure Pestim<Ps1:

a) a minimum present fluid flow section S is evaluated through the nozzle using:
the database B; and
estimated values of the present flow rate D1 and of the estimated present pressure Pestim at the outlet from the nozzle; and then b) as a function of data evaluated present minimum section S the database B is used to determine an ideal pair of values P and Q that ought to be supplied by the pump 5 in order to generate a theoretical level of impact force Fth for the jet that is greater than the predetermined minimum impact threshold; and then c) a new value is given to the first flow rate setpoint D as a function of the flow rate value Q of said ideal pair.

Ideally, at least one of the first, second, and third predetermined pressure thresholds Ps1, Ps2, and Ps3 is determined using the ideal pair of pressure and flow rate values (P, Q) taken from the database B.

As mentioned above, given that the pump has a constant cylinder capacity, it is possible to evaluate the flow rate D1 at which machining fluid is being delivered merely by using a tachometer that measures the speed at which the pump is driven.

In a particular embodiment, it is possible to estimate the outlet pressure Pestim from the nozzle by measuring a parameter Pw representative of the mechanical power consumed by the pump in order to feed the nozzle at the constant flow rate D1.

Estimating the fluid outlet pressure Pestim by means of the mechanical power consumed by the pump and of the constant flow rate, provides an alternative to measuring pressure directly using a pressure sensor. This makes it possible to avoid generating head losses as a result of installing a pressure sensor between the pump and the nozzle.

In practice, it is also possible to estimate pressure simultaneously by means of a pressure sensor C installed between the pump and the nozzle and by measuring the electric power consumed by the motor in correlation with the speed of rotation of the motor.

Estimating the nozzle outlet pressure Pestim on the basis of the power consumed by the motor is particularly advantageous when it is desired to detect the increase in pressure for generating the clogged nozzle alarm Alarm2. The increase in pressure can be detected more quickly by using the measurement of power consumed (by the motor or by the pump) and the flow rate from the pump, than by measuring pressure directly. Furthermore, the combination of:
- estimating pressure via the power consumption correlated with the flow rate; and
- measuring pressure directly by means of a sensor; may be advantageous in order to obtain redundancy in detecting that cooling has stopped.

In the example of FIG. 1, the motor M is an electric motor and the parameter representative of the mechanical power Pw consumed by the pump is the electric power Pw consumed by the motor.

Evaluating the fluid outlet pressure by observing the consumed electric power Pw may serve either to avoid having a pressure measuring sensor C, which is particularly cost-saving, or else to provide redundancy in measurement by using a sensor C.

In a preferred implementation, for a machine tool that is adapted to perform various types of machining operation, each generating its own maximum cutting force, arrangements are made to select the first flow rate setpoint D from a range of setpoint values going from a minimum setpoint value to a maximum setpoint value, which range includes a plurality of distinct values between the minimum and maximum setpoint values. In this implementation, the particular value for the first flow rate setpoint D is selected as a function of the type of machining operation being undertaken.

This implementation makes it possible to select the first flow rate setpoint from amongst a plurality of values as a function of the type of machining operation being undertaken. This serves to adjust the force level F of the jet as a function of the type of swarf to be broken. It is thus possible to limit the impact force of the jet to a force that is just sufficient, thereby reducing wear of the nozzle and wear of the cooling device.

In order to enable the pressure setpoint to be adapted to the type of machining operation, the lubrication method includes a step of generating a machining program. The machining program includes commands for implementing various types of machining operation and parameters representative of values for the first flow rate setpoint D that are associated with at least some of the types of machining operation.

Typically, a command for implementing some particular type of machining operation is a command combining:
- an order to move the tool along a given travel path;
- an order for determining the travel speed of the tool along said path; and
- data representing a value to be given to the first flow rate setpoint during this machining operation.

This data representative of the value to be given to the first flow rate setpoint D may be expressed in the form of a pressure P or in the form of a fluid impact force Fth desired at the outlet from the nozzle.

Thus, at the time of programming, the programmer can select the impact force F that the fluid jet is to generate at the outlet from the nozzle, and can associate it in the program with the desired machining operation. In this implementation, the machine tool includes a processor adapted to control the movements of the tool and to control the cooling device as a function of the machining program. The processor is adapted to determine the first flow rate setpoint D and the first pressure threshold Ps1 as a function of:
- program data (F or D) representative of the values to be given to the first flow rate setpoint during the machining operations; and
- the physical characteristics of the nozzle, including at least the present flow section S of the nozzle.

After installing the tool carrier 8, the tool 2, and the appropriate nozzle 6 on the cooling device 1, the operator enters the present flow section S in a memory connected to the processor.

The processor then implements the method of the invention and calculates the various first flow rate setpoint D and the various first cooling pressure thresholds for application to each of the programmed machining operations.

The processor may also perform a test on the nozzle, using the method of the invention, in order to estimate the present flow section S of the nozzle. Thereafter, the processor may calculate the first flow rate setpoints and the first cooling pressure thresholds as a function of the flow section S that it has estimated.

The implementation of the invention is illustrated by the following example:
- it is desired to generate a force of 52 N on the swarf using a nozzle having a diameter of 1.7 mm, i.e. a flow section $S=\pi \times 1.7^2/4$ square millimeters (mm²);
- reference is then made to the extract of the database B as shown in FIG. 3 in order to discover that for generating such a force of 52 N using a nozzle with a diameter of 1.7 mm, it is necessary to generate a feed pressure P for the nozzle of 230 bar at a flow rate Q of 19.9 L/min;
- the flow rate setpoint D is then set to 19.9 L/min (the constant flow rate setpoint D in this example is equal to the flow rate value Q in the pair of values (P, Q) given by the database B: i.e. D=Q), and the first pressure threshold Ps1 is set to 230 bar (Ps1 is selected to be equal to the pressure value P in the pair of values given by the database B: i.e. Ps1=P as given by the database);
- from the database B it is known that with a nozzle having a diameter of 1.7 mm and with the following pair of values: Q=19.9 L/min and P=230 bar, the electric motor driving the pump ought theoretically to be powered with electric power Pw of 8.5 kW;
- after cooling at a constant flow rate D1=D for a moment, i.e. after cooling while keeping the flow rate setpoint D constant, it is found that the constant flow rate is still about 19.9 L/min, whereas the pressure has changed to 180 bar;
- using the database B, it is then deduced that with a pressure of 180 bar and a flow rate of about 19.9 L/min, the diameter of the corresponding nozzle ought to be 1.8 mm (with a nozzle of diameter Dia=1.8 mm and a pressure of 180 bar, it is found that the data rate Q=19.71 L/min, which value is close to 19.9 L/min); and it is deduced therefrom that, under the effect of wear, the flow section of the nozzle has gone from a diameter of 1.7 mm to a diameter of 1.8 mm;

since it is still desired to generate a force of 52 N at the outlet from the nozzle, the database B is used once more to calculate a new pair of flow rate and pressure values (Q, P) that should be generated in order to obtain Fth=52 N while using a nozzle having a diameter of 1.8 mm; the closest value in the database for 52 N with a nozzle of 1.8 mm is Fth=51.2 N, corresponding to the following pair of pressure and flow rate values, P=200 bar and Q=20.8 L/min; the new theoretical electrical power that needs to be generated to obtain this pair of values with the 1.8 mm nozzle is Pw=7.7 kW instead of 8.5 kW that needed to be generated for a 1.7 mm nozzle; and a new flow rate setpoint D=Q=20.8 L/min and a new first predetermined pressure threshold Ps1=200 bar (Ps1=value from the database B) are determined, and the following values are set:

$$Ps2=Ps1-40 \text{ bar}=160 \text{ bar}$$

and $$Ps3=Ps1+40 \text{ bar}=240 \text{ bar}$$

The motor is then regulated so that the pump delivers the fluid at a flow rate D1 that is as close as possible to the new setpoint D=Q. The present pressure P in the circuit is observed (by a pressure measurement using a pressure sensor and/or by measuring power consumption by the motor in correlation with the flow rate).

If the pressure drops below the predetermined threshold for Ps1 of 160 bar, then a worn nozzle alarm Alarm1 is generated. The drop in the present pressure is monitored under such circumstances via the pressure sensor installed between the pump and the nozzle.

If the present pressure exceeds the threshold of 240 bar, then a clogged nozzle alarm Alarm2 is generated.

In this example pressure increase is monitored on the basis of the following correlation:

power consumption by the motor driving the pump; and
the present flow rate D1.

Thus, by the method of the invention, the impact force F on the swarf may be adjusted to match the ongoing machining operation while taking account of the present flow section of the nozzle. The method thus reduces the risk of machine tool being stopped and of the cooling device malfunctioning.

It should be observed that the method of the invention may be used for cooling cutting tools performing machining operations such as milling, and also during de-burring operations.

What is claimed is:

1. A method of controlling a cooling device for cooling a cutting tool for a machine tool fitted with such a cutting tool, the cooling device comprising:
    a supply of machining fluid;
    a pump connected to the supply;
    a drive motor for driving the pump;
    a cooling nozzle for cooling the tool; and
    at least one machining fluid transfer duct connecting the pump to an input of the nozzle;
    the method comprising the steps of:
    controlling the motor to drive the pump in such a manner that the pump feeds the nozzle with machining fluid at a constant flow rate (D1) that is equal to a first flow rate setpoint D;
    measuring a parameter (P) representative of a fluid outlet pressure from the nozzle; and
    comparing an estimated outlet pressure ($P_{estim}$) as estimated from the parameter (P) with a first predetermined pressure threshold ($P_{s1}$), and controlling the motor so as to increase the fluid flow rate (D1) as delivered by the pump if the estimated output pressure drops below the first pressure threshold ($P_{s1}$);
    the method further including a step of:
    determining the first flow rate setpoint D from a database B that contains, for a plurality of given nozzle flow sections S, flow rate values P, Q for the cooling fluid necessary for generating a given theoretical level of fluid jet impact force $F_{th}$ at the outlet from the nozzle.

2. A method according to claim 1, including the step of comparing the outlet pressure ($P_{estim}$) as estimated from the parameter with a second predetermined pressure threshold ($P_{s2}$), and generating a worn nozzle alarm ($A_{larm1}$) if the estimated outlet pressure ($P_{estim}$) drops below the second predetermined pressure threshold ($P_{s2}$).

3. A method according to claim 1, including the step of comparing the outlet pressure ($P_{estim}$) as estimated from the parameter (P) with a third predetermined pressure threshold ($P_{s3}$), and generating a clogged nozzle alarm ($A_{larm2}$) if the estimated outlet pressure ($P_{estim}$) increases above the third predetermined pressure threshold ($P_{s3}$).

4. A method according to claim 1, wherein the database (B) is a database generated during successive tests of the cutting tool cooling device, the database (B) including a plurality of measured values for the cooling fluid flow rate (Q), and for each measured flow rate value (Q) in the database, the database including an associated nozzle flow section (S) and an associated measured pressure value (P).

5. A method according to claim 1, wherein, in order to determine the increase in fluid flow rate (D) that should be applied when the estimated outlet pressure ($P_{estim}$) drops below the first pressure threshold ($P_{s1}$), the following steps are performed:
    a) evaluating a present minimum fluid flow section (S) through the nozzle using:
        the database (B); and
        estimated values of the present flow rate (D1) of fluid being delivered by the pump and the present fluid outlet pressure ($P_{estim}$); and then
    b) as a function of this present minimum fluid flow section S as evaluated in this way, determining an ideal pair of pressure and flow rate values (P, Q) to be delivered by the pump in order to generate a theoretical fluid jet impact force level ($F_{th}$) that is greater than a predetermined minimum impact threshold; and then
    c) giving the first flow rate setpoint (D) a new value as a function of the flow rate value (Q) of the ideal pair as determined in this way.

6. A method according to claim 1, wherein, in order to control the motor in such a manner that the pump feeds the nozzle with machining fluid at a constant flow rate (D), it is ensured that the pump is a pump having a constant cylinder capacity and the machining fluid flow rate (D1) as actually delivered by said pump is evaluated using a tachometer that measures the number of cycles of the pump over a given time period, and by multiplying the cylinder capacity of the pump by the number of cycles as measured by the tachometer.

7. A method according to claim 1, wherein the parameter that is measured in order to estimate the outlet pressure ($P_{estim}$) of the fluid from the nozzle is a parameter (Pw) representative of the mechanical power consumed by the pump in order to feed the nozzle with the machining fluid at the constant flow rate (D).

8. A method according to claim 6, wherein the motor is an electric motor and the parameter representative of the mechanical power consumed by the pump in order to feed the nozzle with the machining fluid at the constant flow rate is a value for the electric power (Pw) consumed by the motor.

9. A method according to claim 1, wherein the machine tool is adapted to perform various types of machining operation, each generating its own maximum cutting force, and wherein the first flow rate setpoint (D) is selected from a range of setpoint values going from a minimum setpoint value to a maximum setpoint value, said range comprising a plurality of distinct values between said minimum and maximum setpoint values, and the value selected for the first flow rate setpoint (D) being selected as a function of the ongoing type of machining operation.

* * * * *